United States Patent [19]

Iwabuchi et al.

[11] Patent Number: 4,836,769
[45] Date of Patent: Jun. 6, 1989

[54] WATER-COOLED WINDING FOR ELECTROMAGNETIC STIRRER

[75] Inventors: Tadashi Iwabuchi; Takeshi Kawakami, both of Nagasaki, Japan

[73] Assignee: Mitsubishi Denki Kabushiki Kaisha, Japan

[21] Appl. No.: 891,906

[22] Filed: Aug. 1, 1986

[30] Foreign Application Priority Data

| Nov. 26, 1985 | [JP] | Japan | 60-263804 |
| Nov. 26, 1985 | [JP] | Japan | 60-263805 |
| Nov. 26, 1985 | [JP] | Japan | 60-263806 |
| Nov. 26, 1985 | [JP] | Japan | 60-263807 |
| Nov. 26, 1985 | [JP] | Japan | 60-263810 |
| Nov. 26, 1985 | [JP] | Japan | 60-263809 |
| Nov. 26, 1986 | [JP] | Japan | 60-263808 |

[51] Int. Cl.⁴ .................. D02G 3/00; H01B 7/00; H01F 27/30
[52] U.S. Cl. .................. 428/377; 428/251; 428/324; 428/267; 428/363; 428/365; 428/375; 428/376; 428/379; 428/392; 428/395; 428/383; 428/415; 428/416; 428/430; 428/435; 428/473.5; 428/474.4; 428/474.7; 428/475.2; 174/110 N; 174/121 SR; 336/205; 336/206
[58] Field of Search .......... 428/395, 398, 480, 458, 428/473.5, 475.2, 438, 415, 430, 435, 363, 458, 416, 474.4, 474.7, 474.9, 377, 375, 383, 378, 392, 376, 379, 25 P, 25 L, 267, 268, 324; 336/205, 206, 208; 310/208; 174/121 SR, 110 N, 120 SR

[56] References Cited

U.S. PATENT DOCUMENTS

| 2,928,964 | 3/1960 | Jones | 310/208 |
| 3,775,628 | 11/1973 | Anderson et al. | 310/208 |
| 4,117,361 | 9/1978 | Smith et al. | 361/208 |
| 4,163,821 | 8/1979 | Nienart et al. | 428/365 |
| 4,204,181 | 5/1980 | Smith et al. | 310/208 |
| 4,335,367 | 6/1982 | Mitsui et al. | 428/363 |
| 4,399,190 | 8/1983 | Iwabuchi et al. | 428/415 |
| 4,399,191 | 8/1983 | Iwabuchi et al. | 428/415 |
| 4,400,226 | 8/1983 | Horrigan | 310/208 |
| 4,400,676 | 8/1983 | Mitsui | 428/363 |
| 4,418,241 | 11/1983 | Fujiwar | 428/363 |
| 4,724,345 | 2/1988 | Elton et al. | 310/208 |
| 4,724,600 | 2/1988 | Studniarz et al. | 310/208 |

FOREIGN PATENT DOCUMENTS

| 0031555 | 7/1981 | European Pat. Off. | 428/435 |
| 0053267 | 4/1977 | Japan | 336/205 |
| 0072462 | 6/1977 | Japan | 336/205 |
| 53-25235 | 3/1978 | Japan . | |
| 0015444 | 1/1983 | Japan | 310/208 |
| 0029340 | 2/1983 | Japan | 310/208 |
| 0009422 | 3/1985 | Japan | 310/208 |
| 0158215 | 8/1985 | Japan | 428/415 |
| 0237828 | 11/1985 | Japan | 310/208 |
| 1068444 | 1/1984 | U.S.S.R. | 428/415 |
| 1115919 | 9/1984 | U.S.S.R. | 428/415 |

Primary Examiner—Ellis P. Robinson
Assistant Examiner—Donald J. Loney
Attorney, Agent, or Firm—Leydig, Voit & Mayer

[57] ABSTRACT

Disclosed is a water-cooled winding for an electromagnetic stirrer, which comprises a coil including a plurality of wound flat type wires having a wire-insulating turn insulation, and a porous polyamide fiber having an air permeation rate not higher than 25 seconds/100 cm³ of air covering the periphery of the coil, which is impregnated with an epoxy resin composition. In this water-cooled winding, the polyamide fiber is sufficiently impregnated with the epoxy resin composition and this epoxy resin composition is cured stably and assuredly. Accordingly, the mechanical rigidity of the winding is sufficiently high, and the water resistance of the winding is highly improved and is maintained for a long time, with the result that the life of the winding is greatly prolonged.

13 Claims, 1 Drawing Sheet

WATER-COOLED WINDING FOR ELECTROMAGNETIC STIRRER

BACKGROUND OF THE INVENTION

The present invention relates to a water-cooled winding for an electromagnetic stirrer.

Since an electromagnetic stirrer is set in a narrow place, the stirrer should be designed to have a compact size. Furthermore, since a large current is often applied to the stirrer, the superheated portion of the electromagneitc stirrer, such as a winding, that is, a coil, should be cooled. In case of an electromagneitc stirrer having a coil to be air-cooled, a maximum current density of about 3 to about 5 $A/mm^2$ can be used, but if the maximum current density exceeds 10 $A/mm^2$, this electromagnetic stirrer cannot be used. Accordingly, in such a case, an electromagnetic stirrer having a coil to be water-cooled is used.

FIG. 1 is a sectional view of a winding portion of a conventional water-cooled electromagnetic stirrer, and FIG. 2 is an enlarged sectional view of a coil used in the stirrer shown in FIG. 1.

Referring to FIG. 1, a winding-constituting coil 1 comprising a wire wound in an ellipsoidal shape has an iron core 2 inserted therein, and the coil 1 is fixed to the iron core 2 through a wedge 3 and a spacer 4. The coil 1 fixed to the iron core 2 is impregnated with a resin integrally with the iron core 2 for insulation.

In FIG. 2, reference numeral 5 represents a conductor having a predetermined number of turns, for example, a flat type wire. A polyimide film or other film is wound in semi-lap-winding in several turns on the surface of the conductor 5 to form a turn insulation layer 6. For example, a glass tape is wound in 2.5-lap winding on the upper layer of the turn insulation layer 6 along the entire conductor 5 to form a main insulation layer 7.

In case of the conventional water-cooled electromagnetic stirrer, it is indispensable that the turn insulation layer 6 should be composed of an insulating material having a good water resistance and should also exert the function of main insulator layer 7. The main insulation layer 7 takes a role of bundling respective conductors 5 and assists the function of the water-resistant insulation of which the turn insulation layer 6 possesses.

In the winding of the conventional water-cooled electromagnetic stirrer described above, the turn insulation layer 6 is required to be water-resistant, and is required to have a role of electric insulation not only between every two adjacent coil turns but also in the entire coil turns (main insulation). Accordingly, the thickness of the turn insulation layer 6 is increased and the size of the coiled winding as a whole is increased. Moreover, since a flat type wire having the turn insulation layer 6 formed by winding a film in multiple plys is subjected to a coiling process, the turn insulation layer 6 is readily degraded during the processing and the life of the coil 1 is shortened. If a flat type wire is first subjected to the coiling processing and a turn insulation layer 6 is then formed, the operation is extremely complicated and requires many steps, and the production becomes economically disadvantagenous.

SUMMARY OF THE INVENTION

A major object of the present invention is to solve the foregoing problems. Namely, it is a primary object of the present invention to provide a water-cooled winding for an electromagnetic stirrer, in which the finished size of the coil is small, the water resistance of the winding is much improved over the conventional technique, the life is prolonged and the mechanical rigidity of the winding is excellent.

In accordance with the present invention, there is provided a water-cooled winding for an electromagnetic stirrer, which comprises a coil including a plurality of wound flat type wires, each wire, having a wire-insulating turn insulation, and a porous polyamide fiber having an air permeation rate not higher than 25 seconds/100 $cm^3$ of air covering the periphery of the coil, which is impregnated with an epoxy resin composition comprising a bisphenol type epoxy resin, a reactive diluent and an amine type curing agent, said epoxy resin composition being cured after impregnation.

BRIEF DESCRIPTION OF THE DRAWINGS

In the drawings, the same reference numerals represent the same or corresponding members or parts.

DETAILED DESCRIPTION OF THE PREFERRED EMBODIMENTS

In the present invention, as the varnish for treating the flat type wire covered with at least one ply of a glass fiber, there may be used an epoxy varnish, a polyester varnish and a polyimide varnish.

In the present invention, an appropriate heat-resistant enamel is selected from a polyester enamel, a polyesterimide enamel, a polyamide enamel and a polyimide enamel according to the desired degree of the heat resistance.

As the insulating film wound on the surface of the flat type wire as a turn insulation used in an present invention, there can be mentioned a polyimide film, an aramide paper film and a polyester film. For example, films of polyimide such as Kapton (manufactured by Du Pont) and Upilex (manufactured by Ube Kosan) are preferred.

As the backing material used for an aggregated mica tape wound on the surface of the flat type wire to form a turn insulation in the present invention, there can be mentioned a glass cloth, a polyimide film such as Nomex (manufactured by Du Pont), an aromatic polyamide film, a polyester nonwoven fabric, a polyester film and a polyparabanic acid film.

A polymeric fibrid may be used in the aggregated mica foil in the present invention formed of short fiber particles composed, for example, of a polymer having recurring units represented by the followng formula:

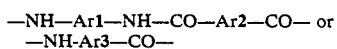

wherein Ar1, Ar2 and Ar3 stand for a divalent aromatic group. An aromatic polyamide fibrid is preferably used. The polymeric fibrid is incorporated in an amount of 1 to 9% by weight based on the aggregated mica foil. If the amount incorporated of the polymeric fibrid is smaller than 1% by weight, the strength of the obtained aggregated mica tape is low, and if the amount incorporated of the polymeric fibrid is larger than 9%, the resin cannot be incorporated into the aggregated mica type.

It is preferred that the air permeation rate of the polyamide fiber used in the present invention be not higher 25 seconds/100 $cm^3$ of air, especially 20 to 25 seconds/100 $cm^3$ of air. If the air permeation rate exceeds 25 seconds/100 $cm^3$ of air, the resin-retaining property is degraded and leakage of the resin occurs. Furthermore, it is preferred that in the polyamide fiber used in the present invention, the area coefficient at a thickness of 0.08 mm (3 mils) be 40 to 60 $g/m^2$ and the area coefficient at a thickness of 0.13 mm (5 mils) be 70 to 90 $g/m^2$. Moreover, a polyamide paper may be used, and Nomex Paper #424 (manufactured by Du Pont) is preferred.

As the epoxy resin composition for impregnation of the polyamide fiber wound on the wire, there is preferably used an epoxy resin composition comprising a bisphenol type epoxy resin, a reactive diluent such as a diglycidyl ether type reactive diluent and an amine type curing agent.

The present invention will now be described in detail with reference to the following examples.

EXAMPLE 1

Figure 1:
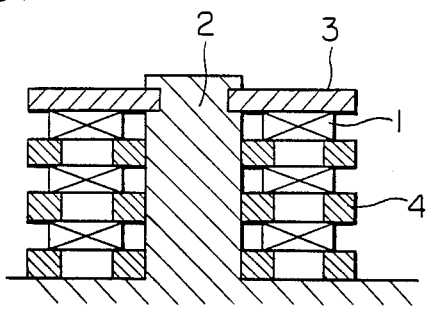
FIG. 1 is a sectional view illustrating the winding portion in a water-cooled electromagnetic stirrer according to one embodiment of the present invention and the winding portion of a conventional water-cooled electromagnetic stirrer.
Figure 2:
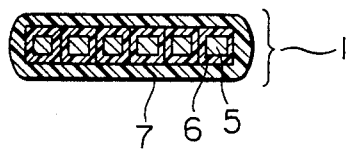
FIG. 2 is an enlarged sectional view illustrating a coil used in the stirrer shown in FIG. 1.

A flat type wire was used as the conductor 5 shown in FIG. 2, and a glass fiber was wound in two plys on the flat type wire and impregnated with an epoxy varnish, followed by curing, to form a turn insulation layer 6. The conductor 5 was coiled in a predetermined number of turns and formed into a coil having a desired shape. A polyamide paper (Nomex Paper #424 manufactured by Du Pont) having an area coefficient of 81.4 $g/m^2$ and an air permeation rate of 25 seconds/100 $cm^3$ of air (determined according to the method of ASTM D-726 A) and also having a thickness of 0.13 mm (5 mils) and a width of 19 mm was wound in 4.5 laps on the above-mentioned coil to form a main insulation layer 7. An iron core 2 as shown in FIG. 1 was inserted into the coil 1, and the coil 1 was fixed to the iron core 2 by using a wedge 3 and a spacer 4 and wire connection was carried out. In the same manner as described above, turn insulation and main insulation were effected on the wire connection portions. The coil 1 was press-impregnated in vacuo with an epoxy resin composition comprising 65 parts of a bisphenol type epoxy resin having an epoxy equivalent of 190, 20 parts of butanediol diglycidylether and 20 parts of a solution of 3 parts of monoethylamine in furfuryl alcohol, and the resin impregnated in the coil 1 was polymerized and cured while drying the coil 1 under rotation.

Figure 3:
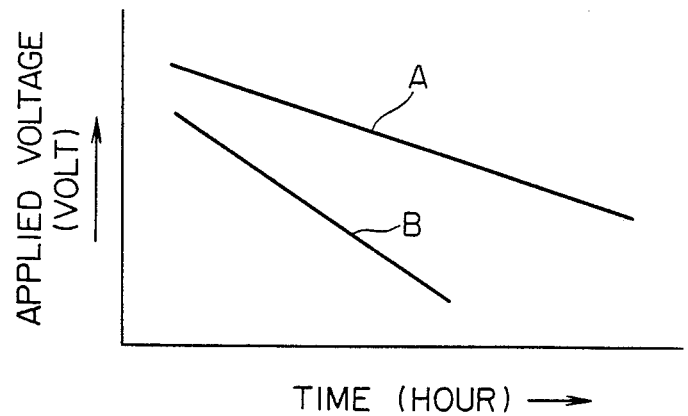
FIG. 3 is a graph illustrating the deterioration characteristics under application of electricity in water in one embodiment of the present invention and the coil used in the conventional water-cooled electromagnetic stirrer.

The deterioration characteristics of the so-prepared coil under application of electricity in water were determined. Namely, the coil 1 was placed in water and a voltage was applied, and the deterioration characteristics were determined from the relation between the applied voltage and the time required for breakdown of the coil 1. The results obtained are shown in FIG. 3, in which curve A shows the results obtained with respect to the coil 1 of the present invention and curve B shows the results obtained with respect to the conventional coil 1. The value obtained after the passage of 1 minute was 30 KV in case of the coil of the present invention (curve A) and 10 KV in case of the conventional coil (curve B). Accordingly, it was confirmed that the coil of the present invention is much better than the conventional coil with respect to the deterioration resistances thereof. The reason is considered to be that since the main insulation layer 7 of the coil of the present invention is very dense, the water resistance and the resistance against deterioration under application of electricity in water are improved. Therefore, in the coil of the present invention, the reliability is much improved over that of the conventional water-cooled coil, in which each turn insulation layer 6 is formed to have a water resistance.

After completion of the treatment of the main insulation layer, the so-called inter-turn dielectric breakdown voltage was measured by applying a voltage between the flat type wires. It was found that this dielectric breakdown voltage was 4 KV.

In the above example, turn insulation was attained by winding the glass fiber in two plys on the flat type wire, impregnating the glass fiber with the epoxy resin and curing the epoxy resin. Other embodiments for attaining turn insulation according to the present invention will now be described in the following examples. Incidentally, in each example, the main insulation layer 7 was formed in the same manner as described in Example 1.

EXAMPLE 2

A flat type wire was used as the conductor 5, and a polyesterimide enamel was coated and baked on the flat type wire to form a turn insulation layer 6. The inter-turn dielectric breakdown voltage was 15 KV.

EXAMPLE 3

A flat type wire was used as the conductor 5, and a polyesterimide enamel was coated and baked on the flat type wire. A glass fiber was wound in two plys on the surface of the enamel layer and the glass fiber was treated with a varnish to form a turn insulation layer 6. The inter-turn dielectric breakdown voltage was 20 KV.

EXAMPLE 4

A flat type wire was used as the conductor 5, and a polyimide film having a thickness of 0.025 mm (Kapton manufactured by Du Pont) was lap-wound in 1.5 turns on the flat type wire to form a turn insulation layer 6. The inter-turn dielectric breakdown voltage was 20 KV.

EXAMPLE 5

A flat type wire was used as the conductor 5, and an aggregated mica tape comprising a polyester film as the backing and having a finish thickness of 0.13 mm was wound in one turn on the flat type wire to form a turn insulation layer 6. The inter-turn dielectric breakdown voltage was 25 KV.

EXAMPLE 6

A flat type wire was used as the conductor 5 and an aggregated mica tape formed by fusion-bonding an aromatic polyamide paper as the backing to an aggregated mica foil comprising 9% by weight of an aromatic polyamide fibrid was wound in ½ ply in two turns on the flat type wire to form a turn insulation layer 6. The inter-turn dielectric breakdown voltage was 25 KV.

As is apparent from the foregoing description, the wiring of the present invention comprises a coil including a plurality of wound flat type wires having a wire-insulating turn insulation, and a porous polyamide fiber covering the periphery of the coil, which is impregnated with an epoxy resin composition comprising a bisphenol type epoxy resin, a reactive diluent and an amine type curing agent, said epoxy resin composition being cured after impregnation. In the winding of the present invention, the polyamide fiber is sufficiently impregnated with the epoxy resin composition and this epoxy resin composition is cured stably and assuredly. Accordingly, the mechanical rigidity of the winding is improved and the water resistance can be maintained at a high level for a long time to prolong the life of the winding. Moreover, in the water-cooled winding according to the present invention, the manufacturing steps are simplified, and the winding of the present invention is advantageous from the economical viewpoint. These are effects attained by the present invention.

We claim:

1. A compact water-cooled winding for an electrical device which comprises a coil including (a) a plurality of wound flat type wires, each wire having a wire-insulating turn insulation, and (b) a porous polyamide fiber having an air permeation rate not higher than 25 seconds/100 cm$^3$ of air covering an epoxy resin composition comprising a bisphenol epoxy resin, a reactive diluent, and an amine type curing agent, said epoxy resin composition being cured after impregnation.

2. A winding as set forth in claim 1 wherein a glass fiber is wound in at least one ply on the flat surface of the flat type wire and is treated with a varnish to form the turn insulation.

3. A winding as set forth in claim 2 wherein the varnish is selected from the group consisting of an epoxy varnish, a polyester varnish and a polyimide varnish.

4. A winding as set forth in claim 1 wherein the flat type wire is an enamelled flat type wire having an enamel coated and baked thereon.

5. A winding as set forth in claim 4 wherein the enamel is selected from the group consisting of a polyester enamel, a polyesterimide enamel, a polyamide enamel and a polyimide enamel.

6. A winding as set forth in claim 1 an insulating film is wound on the surface of the flat type wire to form the turn insulation.

7. A winding as set forth in claim 6 wherein the insulating film is selected from the group consisting of a polyimide film, an aramid paper film and a polyester film.

8. A winding as set forth in claim 1 wherein an aggregated mica tape formed by supporting an aggregated mica foil by a backing material is wound on the surface of the flat type wire to form the turn insulation.

9. A winding as set forth in claim 8 wherein the aggregated mica foil comprises 1 to 9% by weight of a polymeric fibrid incorporated therein.

10. A winding as set forth in claim 8 wherein the backing material is selected from the group consisting of a glass cloth, an aromatic polyamide film, a polyimide film, a polyester film, a polyester nonwoven fabric and a polyparabanic acid film.

11. A winding as set forth in claim 1 wherein the polyamide fiber has an air permeation rate of 20 to 25 seconds/100 cm$^3$ of air.

12. A winding as set forth in claim 1 wherein said reactive diluent comprises a diglycidyl ether.

13. A winding as set forth in claim 1 wherein said electrical device is an electromagnetic stirrer.

* * * * *